(12) United States Patent
Delano

(10) Patent No.: US 6,997,618 B2
(45) Date of Patent: Feb. 14, 2006

(54) BEARING HOUSING WITH DIVIDED DRAINAGE AND OIL POOLING ANNULUS

(75) Inventor: Peter G. Delano, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 100 days.

(21) Appl. No.: 10/747,836

(22) Filed: Dec. 29, 2003

(65) Prior Publication Data

US 2005/0141793 A1   Jun. 30, 2005

(51) Int. Cl.
*F16C 33/66* (2006.01)
(52) U.S. Cl. .................. 384/462; 184/5.1; 384/473
(58) Field of Classification Search ............. 384/462, 384/466, 471, 473, 474, 322, 397, 400, 403; 184/5, 5.1, 103.1
See application file for complete search history.

(56) References Cited

U.S. PATENT DOCUMENTS

| | | | | |
|---|---|---|---|---|
| 1,967,705 A | * | 7/1934 | Bullmer | 384/403 |
| 2,010,896 A | * | 8/1935 | Richard | 384/403 |
| 5,001,377 A | * | 3/1991 | Parkinson | 384/473 |
| 5,560,619 A | * | 10/1996 | Acree | 384/403 |

* cited by examiner

*Primary Examiner*—Thomas R. Hannon
(74) *Attorney, Agent, or Firm*—Bachman & LaPointe, P.C.

(57) ABSTRACT

A bearing housing comprising an annulus having an aft side and a forward side, a barrier extending from the aft side to the forward side to form a first and second zone, a first opening in the first zone extending through the forward side, and a second opening in the second zone extending through the forward side at least a portion of the first opening being at a level lower than a lowermost level of the second opening.

6 Claims, 2 Drawing Sheets

BEARING HOUSING WITH DIVIDED DRAINAGE AND OIL POOLING ANNULUS

U.S. GOVERNMENT RIGHTS

The Government may have rights in this invention, pursuant to Contract No. N00019-02-C-3003, awarded by the United States Navy.

BACKGROUND OF THE INVENTION (1) Field of the Invention

The present invention relates to a bearing housing, and method for so producing, which allows for both the drainage and the pooling of oil.

(2) Description of the Related Art

Typically, bearing housings are designed to perform numerous functions including protecting the bearing compartment from the outside environment, supporting a bearing, and providing a means of draining oil away from the bearings and seals to a scavenge pick up. However, it is often times preferable to retain an amount of oil in a reserve reservoir for use in the instance that supply of oil to the bearing housing is momentarily interrupted. The idea of retaining oil, or maintaining an oil reservoir, is therefore in conflict with the fundamental function of draining oil back to scavenge lines. Without drain back capability whereby oil is drained back to the scavenge lines, the bearing housing compartment can be flooded with oil resulting in operational problems.

There is therefore a need for a bearing housing which balances the need for maintaining an oil reservoir with the conflicting need of draining oil out of the bearing housing and into scavenge lines. Specifically, there is a need for a bearing housing design which balances these two conflicting requirements.

SUMMARY OF THE INVENTION

Accordingly, it is an object of the present invention to provide a bearing housing, and method for so producing, which allows for both the drainage and the pooling of oil.

In accordance with the present invention, a bearing housing comprises an annulus having an aft side and a forward side, a barrier extending from the aft side to the forward side to form a first and second zone, a first opening in the first zone extending through the forward side, and a second opening in the second zone extending through the forward side at least a portion of the first opening being at a level lower than a lowermost level of the second opening.

In further accordance with the present invention, a method of draining and pooling oil in an annulus comprises the steps of forming an annulus from an aft side and a forward side, providing a barrier extending from the aft side to the forward side at a height to form a first and second zone, forming a first opening extending through the forward side at least a portion of the first opening located below a fill level, forming a second opening extending through the forward side and located above the fill level, and evacuating oil through the first opening from the first zone and pooling oil in the second zone.

DETAILED DESCRIPTION

It is therefore a teaching of the present invention to provide a bearing housing which makes use of a first and a second opening extending into the bearing housing on either side of a barrier positioned so as to simultaneously drain excess oil and retain a sufficient reserve of oil. As will be described more fully below, the aforementioned openings are able to maintain two separate and different levels of oil resulting from the fact that they extend into two separate zones formed on either side of a barrier. The barrier is created during the casting of the bearing housing. The air pipe serves as an exit for high pressure air supplied to the housing bearing so as to affect a tight seal and provide egress for any oil that may overcome the seal. The present invention makes use of the barrier to both drain oil on one side of the barrier to the first opening and reserve oil on the other side of the barrier.

In general, oil is pumped into a bearing compartment through oil supply tubes. It is then generally dived into desirable proportions through manifolds, nozzles, or internal passage ways. Some of this oil may be jetted at a target through a nozzle. Often this target is a, bearing, gear, seal, additional passageway, or other structures. In this bearing compartment some oil is directed at a bearing and seal. This bearing and seal is housed by the bearing housing 10. Of the oil that is directed at the bearing, roughly equal portions of that oil pass through the bearing in the forward and aft directions traveling radially outwards. The oil that has traveled aft of the bearing and radially outwards is collected by the bearing housing 10. Oil directed towards the seal, which is aft of the bearing, travels radially outwards, is also collected by the housing 10. The aggregate of the oil that has traveled aft of the bearing is collected by the bearing housing 10 and drained or collected, according to the principle of the present invention.

Figure 1:
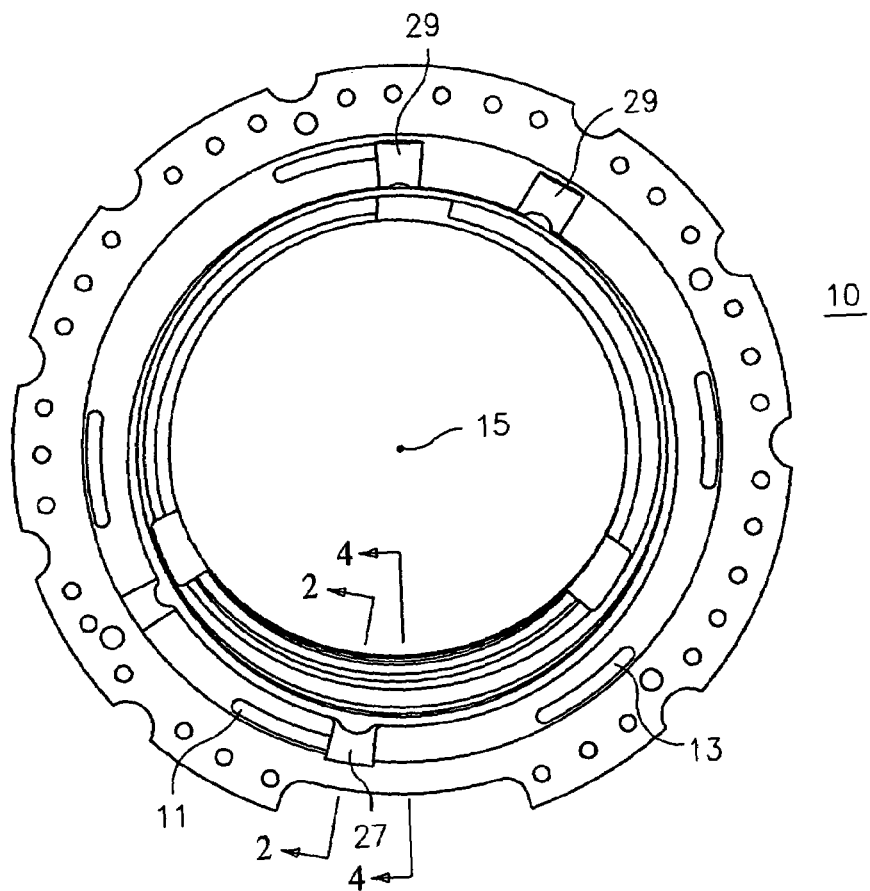
FIG. 1 A perspective line rendering of the bearing housing of the present invention showing the orientation of the cross section forming FIG. 4 and FIG. 2.
Figure 4:
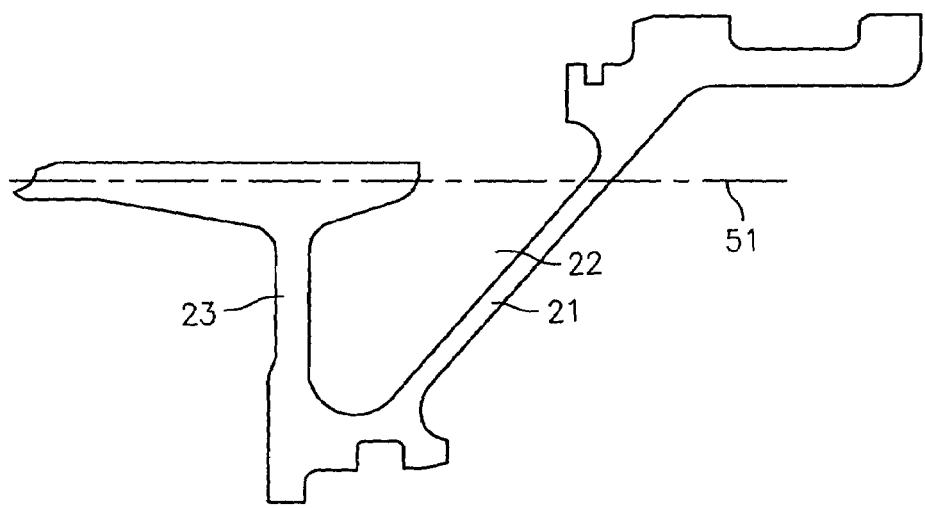
FIG. 4 A cross section of the bearing housing of the present invention.
Figure 3:
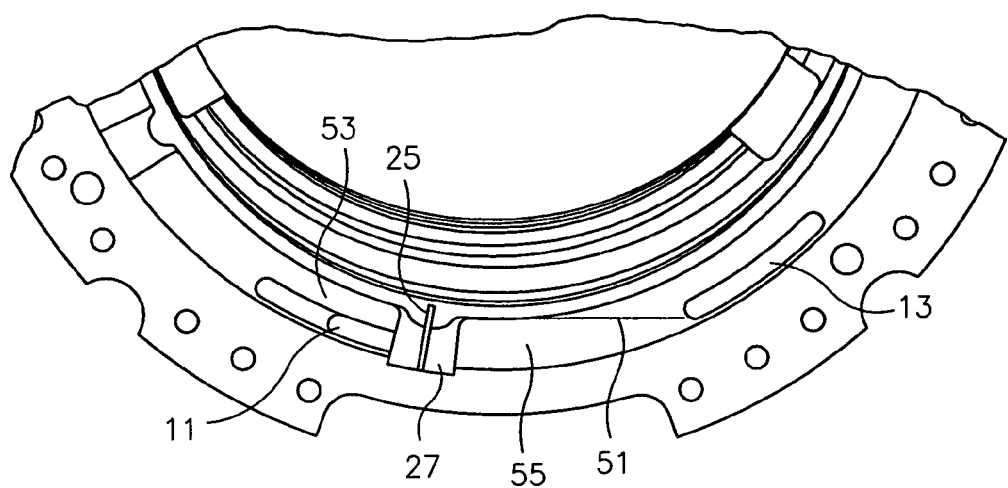
FIG. 3 A perspective line rendering of the bearing housing of the present invention showing the placement of the openings, the barrier, and the water line.

With reference to FIGS. 1 and 3, there is illustrated the bearing housing 10 of the present invention. Bearing housing 10 is radially disposed about a centerline 15. Air is pumped into the bearing housing 10 through entrance air pipe 29 and the air exits the bearing housing towards the bottom of the bearing housing 10 through exit air pipe 27. With reference to FIG. 4, there is illustrated in detail a partial cross-section of bearing housing 10 as taken along line 4—4 of FIG. 1. Bearing housing 10 is comprised of an aft side 21 and a forward side 23 forming annulus 22. In operation, the bearing housing 10 is situated as illustrated in FIG. 3 such that oil within the bearing housing 10 will collect under force of gravity within the annulus 22 at the bottom of bearing housing 10 in the vicinity of exit air pipe 27 located towards the bottom of bearing housing 10. Note that section 4—4 is taken at bottom dead center (BDC) of the bearing housing 10 during operation. Note further, that exit air pipe 27 is slightly displaced from bottom dead center (BDC).

Figure 2:
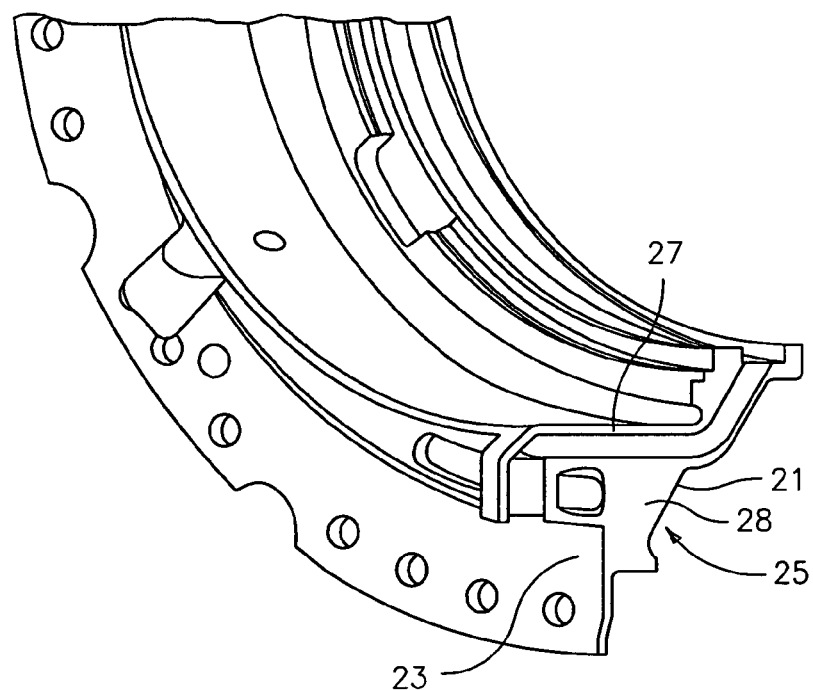
FIG. 2 A cross section illustration the bearing housing of the present invention showing the barrier.

With reference to FIG. 2, there is illustrated the barrier formed by the fabrication of exit air pipe 27. FIG. 2 is a perspective rendering showing a cross-section of bearing housing 10 taken through the centerline of exit air pipe 27 along line 2—2 of FIG. 1. As can be seen, a barrier 25 is formed from air pipe 27 and a blocking element 28 extending from beneath exit air pipe 27 downwards and outwards and into contact with both aft side 21 and forward side 23. As a result, barrier 25 prevents the free movement of oil collecting at the bottom of bearing housing 10 from side-to-side. Because barrier 25 prevents the free movement of oil from one side of barrier 25 to the other side of barrier 25 within annulus 22, it is possible to fabricate draining holes through forward side 23 from annulus 22 such that oil drains from each side of barrier 25 at a different rate.

With reference to FIG. 3, there is illustrated in detail the position and function of first opening 11 and second opening 13 used to achieve a differential accumulation/drainage of oil having pooled at the bottom of annulus 22. Barrier 25 effectively separates annulus 22 into a first side 53 and a second side 55. Fill level 51 defines the uppermost desirable level of oil such that the amount of oil retained on second side 55 bounded by barrier 25, aft side 21, and forward side 23 is of an amount sufficient to meet the retained oil requirements of bearing housing 10. Second opening 13 is preferably fabricated through forward side 23 into annulus 22 such that the lowest part of second opening 13 is at the same approximate level as water level 51. Fill level 51 is preferably just below the highest point of barrier 25. Conversely, first opening 11 is fabricated through forward side 23 and extending into annulus 22 on first side 53 in as close a proximity as is practicable to barrier 25. The size of the first opening 11 is selected to provide for oil drainage in accordance with the specified oil drainage requirement of the bearing housing 10. In a preferred embodiment, openings 11, 13 form slots circumferentially disposed about forward side 23.

In operation, oil tends to pool at the bottom of bearing housing 10 and annulus 22 on both sides of barrier 25 at approximately the same rate. As first opening 11 is located quite close to BDC and in proximity to the barrier 25, oil which begins to collect on first side 53 tends to evacuate the bearing housing 10 through first opening 11. Conversely, as oil begins to collect on second side 55 of annulus 22, the oil so collecting tends to form a reserve whose level steadily increases until the level of the oil in reserve reaches fill level 51. At the point at which the oil level reaches fill level 51, any addition of oil to second side 55 results in the evacuation of oil through second opening 13. Thus, there is continually evacuated, or scavenged, oil from the first side 53 of bearing housing 10, while simultaneously there is pooled in reserve a desired volume of oil extending up to water level 51. In the event that oil should collect so quickly such that the oil level in both first side 53 and second side 55 rises above the top of barrier 25, both the first opening 11 and second opening 13 will act in unison to evacuate excess oil.

It is apparent that there has been provided in accordance with the present invention a bearing housing, and method for so producing, which allows for both the drainage and the pooling of oil which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A bearing housing comprising:
   an annulus having an aft side and a forward side;
   a barrier extending from said aft side to said forward side to form a first and second zone;
   a first opening in said first zone extending through said forward side; and
   a second opening in said second zone extending through said forward side, at least a portion of said first opening being at a level lower than a lowermost level of said second opening.

2. The bearing housing of claim 1 wherein a fill level is below a height of said barrier.

3. The bearing housing of claim 2 wherein said second zone is bounded by said barrier, said aft side, said forward side, and said fill level.

4. The bearing housing of claim 3 wherein said second zone has a volume equal to an amount of retained oil equal to a retained oil requirement of said bearing housing.

5. The bearing housing of claim 1 wherein said first opening and said second opening are radially disposed about said forward side.

6. The bearing housing of claim 1 wherein said barrier comprises a blocking element and an air pipe attached to an upper portion of said blocking element.

* * * * *